United States Patent
Basrur et al.

(10) Patent No.: US 10,638,520 B2
(45) Date of Patent: Apr. 28, 2020

(54) METHOD AND APPARATUS FOR AUTOMATED CIRCUIT SWITCH FALLBACK IN A SMALL CELL SYSTEM

(71) Applicant: CommScope Technologies LLC, Hickory, NC (US)

(72) Inventors: Jyotin Prakash Basrur, Shrewsbury, MA (US); Ehsan Daeipour, Chelmsford, MA (US); Ram Mohan Vaddepuri, Bellandur (IN)

(73) Assignee: CommScope Technologies LLC, Hickory, NC (US)

( * ) Notice: Subject to any disclaimer, the term of this patent is extended or adjusted under 35 U.S.C. 154(b) by 3 days.

(21) Appl. No.: 15/888,625

(22) Filed: Feb. 5, 2018

(65) Prior Publication Data

US 2018/0242377 A1    Aug. 23, 2018

Related U.S. Application Data

(60) Provisional application No. 62/460,172, filed on Feb. 17, 2017.

(51) Int. Cl.

| | |
|---|---|
| *H04L 12/26* | (2006.01) |
| *H04W 76/10* | (2018.01) |
| *H04W 60/06* | (2009.01) |
| *H04W 24/02* | (2009.01) |
| *H04W 84/04* | (2009.01) |

(52) U.S. Cl.
CPC .......... *H04W 76/10* (2018.02); *H04W 24/02* (2013.01); *H04W 60/06* (2013.01); *H04W 84/045* (2013.01); *H04W 84/047* (2013.01)

(58) Field of Classification Search
None
See application file for complete search history.

(56) References Cited

U.S. PATENT DOCUMENTS

| | | | | |
|---|---|---|---|---|
| 8,107,950 B2* | 1/2012 | Amirijoo | .......... | H04W 36/0083 455/423 |
| 8,594,678 B2* | 11/2013 | Livneh | ................ | H04W 84/045 455/444 |
| 8,600,386 B2* | 12/2013 | Osborn | ................. | H04W 76/10 455/436 |
| 2009/0005042 A1 | 1/2009 | Bi | | |

(Continued)

OTHER PUBLICATIONS

International Searching Authority, "International Search Report and Written Opinion for PCT Application No. PCT/US2018/016865 dated Jun. 5, 2018", "Foreign Counterpart to U.S. Appl. No. 15/888,625", Jun. 5, 2018, pp. 1-15, Published in: WO.

*Primary Examiner* — Sithu Ko
(74) *Attorney, Agent, or Firm* — Fogg & Powers LLC

(57) ABSTRACT

A method for operating a small cell system. The method comprises: connecting a 2G/3G small cell and a LTE small cell with at least one management system prior to connecting the 2G/3G small cell with the LTE small cell; connecting the 2G/3G small cell with the LTE small cell; providing 2G/3G small cell parameters to the LTE small cell; adjusting a transmission power of at least one of the 2G/3G small cell and the LTE small cell; determining if the 2G/3G small cell remains operational; and if the 2G/3G small cell does not remain operational, then configuring the LTE small cell to use a 2G/3G base station to provide circuit-switched fall back.

20 Claims, 3 Drawing Sheets

(56) References Cited

U.S. PATENT DOCUMENTS

| | | | |
|---|---|---|---|
| 2009/0111471 A1* | 4/2009 | Li | H04W 36/14 455/437 |
| 2012/0170503 A1* | 7/2012 | Kelley | H04W 48/06 370/312 |
| 2013/0051362 A1* | 2/2013 | Lee | H04W 36/30 370/331 |
| 2013/0053091 A1 | 2/2013 | Jorguseski et al. | |
| 2013/0331054 A1* | 12/2013 | Kodali | H04W 36/14 455/404.1 |
| 2014/0086208 A1 | 3/2014 | Murray et al. | |
| 2014/0233529 A1 | 8/2014 | Prakash et al. | |
| 2014/0256340 A1* | 9/2014 | Prakash | H04W 52/244 455/452.1 |
| 2014/0295823 A1* | 10/2014 | Someya | H04W 88/10 455/423 |
| 2014/0348014 A1* | 11/2014 | Teshima | H04W 24/10 370/252 |
| 2015/0117360 A1* | 4/2015 | Shen | H04W 52/242 370/329 |
| 2015/0373629 A1 | 12/2015 | Zeng et al. | |

* cited by examiner

METHOD AND APPARATUS FOR AUTOMATED CIRCUIT SWITCH FALLBACK IN A SMALL CELL SYSTEM

CROSS-REFERENCE TO RELATED APPLICATIONS

The present application claims benefit of U.S. Patent Application Ser. No. 62/460,172, filed Feb. 17, 2017; the entire content of the aforementioned patent application is incorporated herein by reference as if set forth in its entirety.

BACKGROUND

A Long Term Evolution (LTE) wireless network includes an Evolved Universal Terrestrial Radio Access Network (E-UTRAN) (also sometimes referred to simply as the "radio access network" or "RAN") and an Evolved Packet Core (EPC) network (also sometime referred to simply as the "core network").

The E-UTRAN comprises a set of base stations that wirelessly communicate with items of user equipment (such as smartphones) using licensed radio frequency spectrum. Each base station is also generally referred to as an "eNodeB" or "eNB."

One type of eNodeB is a "macro" eNodeB, which is a higher-power base station that is typically used to provide base station capacity in a relatively large area that includes both outdoor areas and indoor areas. In general, each location within a service provider's network is notionally within the coverage area of at least one macro eNodeB. However, in practice, there are some locations (for example, within homes and office buildings) for which good coverage cannot be provided by any macro eNodeB in an operator's network. Also, there may be some locations (for example, within public venues such as office buildings, stadiums, airports, etc.) where a large number of users congregate during certain periods. During those periods, the associated macro eNodeBs may not be able provide sufficient base-station capacity to the congregated users, even if it is possible to provide sufficient wireless coverage.

One type of eNodeB is a "small cell" or "femtocell," which is a lower-power base station. A small cell can be used to provide improved wireless coverage and/or capacity in order to address the issues noted in the previous paragraph. This is done by deploying the small cell directly with the location that has a coverage and/or capacity issue.

Unlike the 2G and 3G wireless standards, the LTE standard only supports packet switching. As a result, support for voice calls must be provided in some other way when LTE is used. One way is to use Voice-over-LTE (VoLTE), which is an LTE standard that specifies how voice calls can be provided directly using LTE. However, not all LTE eNodeBs include support for VoLTE. Further, not all items of user equipment (UE) support VoLTE. Another way to support voice calls using LTE is referred to as "Circuit-Switched Fall Back" (CSFB). With CSFB, the LTE eNodeB only provides data service to items of user equipment. If a UE makes or receives a voice call, the UE will fall back to a 2G or 3G base station that is providing wireless service in the same area in order to complete the call. The 2G or 3G base station supports circuit switching, and is able to serve voice calls for the UE.

In order for a UE to fall back from an LTE eNodeB to a 2G or 3G base station, the LTE eNodeB is commonly configured with the operating parameters of that 2G or 3G base station. This configuration occurs initially at time of installation of the eNodeB and subsequently upon any modifications to those operating parameters due to changes in the associated 2G or 3G network or when the 2G or 3G base station is turned off (for example, for maintenance).

Typically, this configuration is done manually, which is expensive. Also, LTE small cell eNodeBs are typically deployed in much greater numbers than LTE macro eNodeB. However, manual configuration of CSFB does not scale well to support small cell deployments.

Moreover, when CSFB is used by a UE to make a voice call, there is typically a delay that results from the UE making measurements of the neighboring 2G or 3G eNodeBs.

SUMMARY OF THE INVENTION

A method for operating a small cell system. The method comprises: connecting a 2G/3G small cell and a LTE small cell with at least one management system prior to connecting the 2G/3G small cell with the LTE small cell; connecting the 2G/3G small cell with the LTE small cell; providing 2G/3G small cell parameters to the LTE small cell; adjusting a transmission power of at least one of the 2G/3G small cell and the LTE small cell; determining if the 2G/3G small cell remains operational; and if the 2G/3G small cell does not remain operational, then configuring the LTE small cell to use a 2G/3G base station to provide circuit-switched fall back.

DRAWINGS

DETAILED DESCRIPTION

Embodiments of the present invention provide a technique to enable an LTE small cell providing circuit-switched fall back (CFSB) to a 2G/3G small cell that is automatically configured. Advantageously, embodiments of the present invention enable the LTE small cell and the 2G/3G small cell to be automatically configured, maintained, and modified depending upon operational status of the 2G/3G small cell.

Figure 1:
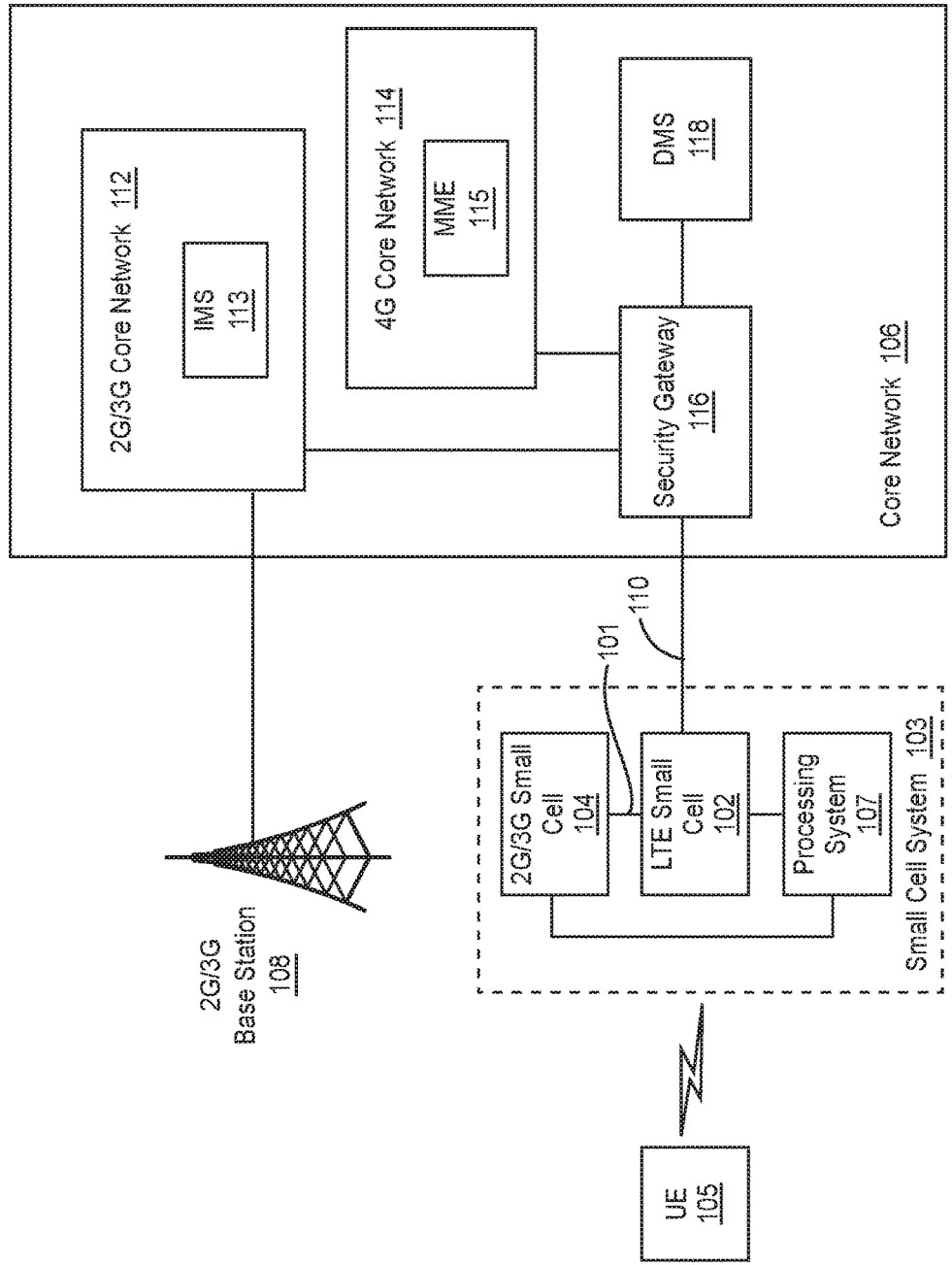
FIG. 1 illustrates a block diagram of an exemplary communications network with a small cell providing circuit-switched fall back that is automatically configured and maintained.

FIG. 1 illustrates a block diagram of an exemplary communications network 100 with a small cell system 103 providing circuit-switched fall back that is automatically configured, maintained, and modified. The communications network 100 includes the small cell system 103, a core network 106, a 2G/3G base station 108, and a communications link 110. The communications network 100 includes other components, not shown, such as one or more LTE macro eNodeBs, and possibly other macro 2G/3G base stations. The communications network 100 is used to provide wireless service to at least one item of user equipment 105.

In one embodiment, the small cell system 103 includes a LTE small cell 102 and a 2G/3G small cell 104. The 2G/3G small cell 104 is configured to facilitate voice calls using at least one of a 2G or 3G air interface. For example, the 3G air interface can be based upon CDMA IS1000 or 3G Universal Mobile Telecommunications System (UMTS) technologies. In another embodiment, the small cell system 103 includes a processing system 107. In a further embodiment, the processing system 107 is coupled to each of the LTE small cell 102 and the 2G/3G small cell 104. In a further embodiment, the processing system 107 may be incorporated in either or both of the LTE small cell 102 and the 2G/3G small cell 104.

In one embodiment, each of the LTE small cell 102 and the 2G/3G small cell 104 are configured to cover two or more sectors, e.g. to facilitate operation on different operating frequencies. In one embodiment, the sectors are implemented with separate transceivers and sector antennas. Although the LTE small cell 102 and 2G/3G small cell 104 are exemplified in the following embodiments, the embodiments can be implemented using two or more sectors.

The LTE small cell 102 and the 2G/3G small cell 104 are proximate and coupled to one another. In one embodiment, the LTE small cell 102 and the 2G/3G small cell 104 are co-packaged, or even integrated into the same hardware. In another embodiment, the LTE small cell 102, the 2G/3G small cell 104, and the processing system 107 are co-packaged. In a further embodiment, the processing system 107 may be located remotely from the LTE small cell 102 and the 2G/3G small cell 104.

In one embodiment, the LTE small cell 102 is coupled to the 2G/3G small cell 104 by a communications network 101 such as an Ethernet network. In another embodiment, the LTE small cell 102 and the 2G/3G small cell 104 communicate over the communications network 101 by unicasting, broadcasting, or multicasting Internet Protocol (IP) datagrams.

In this embodiment, the small cell system 103 is configured to use circuit switched fallback (CSFB) to enable at least one item of user equipment 105 to use circuit-switching, and circuit-switched services (such as voice calls and short message service (SMS) messaging). The 3rd Generation Partnership Project (3GPP) has promulgated standards specify how CSFB is can be deployed. CSFB can be used where the LTE small cell 102 or the item of user equipment 105 is unable to place voice calls using VoLTE (e.g. because either or both are not configured to or are not capable of doing so). In this embodiment, with CSFB, the item of user equipment 105 communicates data, e.g. Internet Protocol packets, through the LTE small cell 102, and places voice calls through the 2G/3G small cell 104. To facilitate this, the LTE small cell 102 and the 2G/3G small cell 104 are automatically configured, maintained, and modified to use CFSB as will be further described.

The small cell system 103 (more specifically the LTE small cell 102 in the small cell system 103) is coupled to the core network 106 by a communications link 110. In one embodiment, the communications link 110 comprises a wide area network, such as the Internet. In another embodiment, the communications link 110 comprises a wireless backhaul communications link. For example, such a wireless backhaul communications link can be implemented using a wireless link established with a macro eNodeB that is coupled to the core network 106. Such a wireless backhaul communication link can be implemented in other ways. The 2G/3G base station 108 is coupled to the core network 106. In one embodiment, the 2G/3G base station 108 is a macro 2G/3G base station.

In one embodiment, the core network 106 includes a 2G/3G core network 112, coupled to a 4G core network 114.

In another embodiment, the core network 106 includes a device management system (DMS) 118 coupled to the 2G/3G core network 112 and the 4G core network 114. In a further embodiment, the 4G core network 114 includes various standard entities, such as a mobility management entity (MME) 115 which is responsible for facilitating attachment, paging, bearer establishment, and mobility of the item of user equipment 105. In yet another embodiment, the 2G/3G core network 112 includes various standard entities, such as an IP multimedia protocol sub-system (IMS) 113 which delivers voice and multimedia information.

In one embodiment, at least one management device tracks and manages (including storing cell identifiers) each of one or more LTE small cells 102 and the 2G/3G small cells 104. In another embodiment, the at least one management device is the device management system 118. In another embodiment, however, the at least one management system is the processing system 107 in one or more small cell systems 103, and no management device external to small cell systems 103 is required; thus, for this embodiment, the device management system 118 is not required to perform the same function and may not be incorporated in the core network 106.

In one embodiment, e.g. when the communications link 110 comprises a public wide area network such as the Internet, the core network 106 includes a security gateway 116. The security gateway 116 is used to create secure connections, e.g. virtual private network(s), linking the 2G/3G core network 112*a*, the 4G core network 114, and the device management system 118 to the small cell system 103, e.g. the LTE small cell 102.

Figure 2:
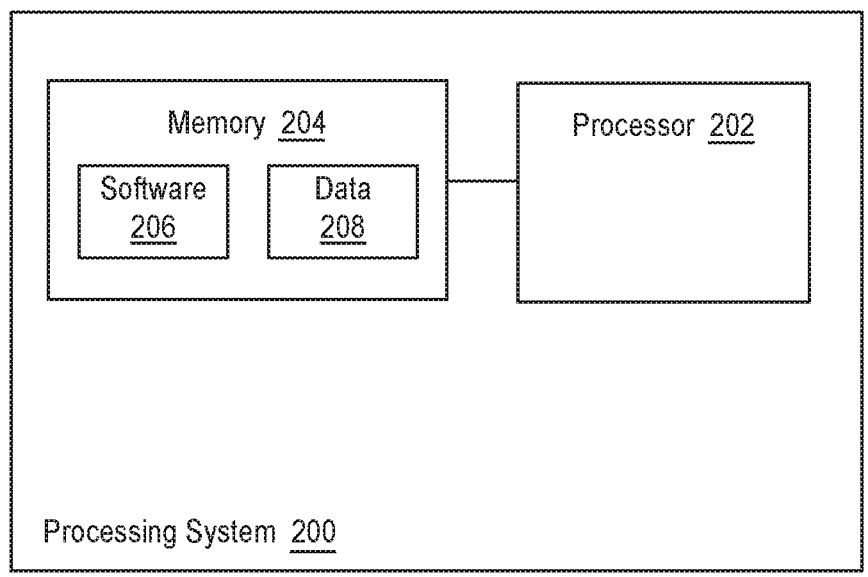
FIG. 2 illustrates one embodiment of an exemplary processing system that automates configuration and maintenance of circuit-switched fall back.

FIG. 2 illustrates one embodiment of an exemplary processing system 200 that automates configuration, maintenance, and modification of circuit-switched fall back. The processing system 200 includes a processor 202 coupled to a memory 204. The memory 204 includes software 206 to implement the automated configuration or implementation, maintenance, and modification of such configuration. The methodology performed by the software 206 executed on the processor 202 will be subsequently described. In another embodiment, the memory 204 includes data 208 comprising parameters of the LTE small cell 102 and the 2G/3G small cell 104 needed to perform such configuration, maintenance, and modification. In a further embodiment, a state machine may be used to implement the processing system 200, or the processor 202 and the software 206.

Figure 3:
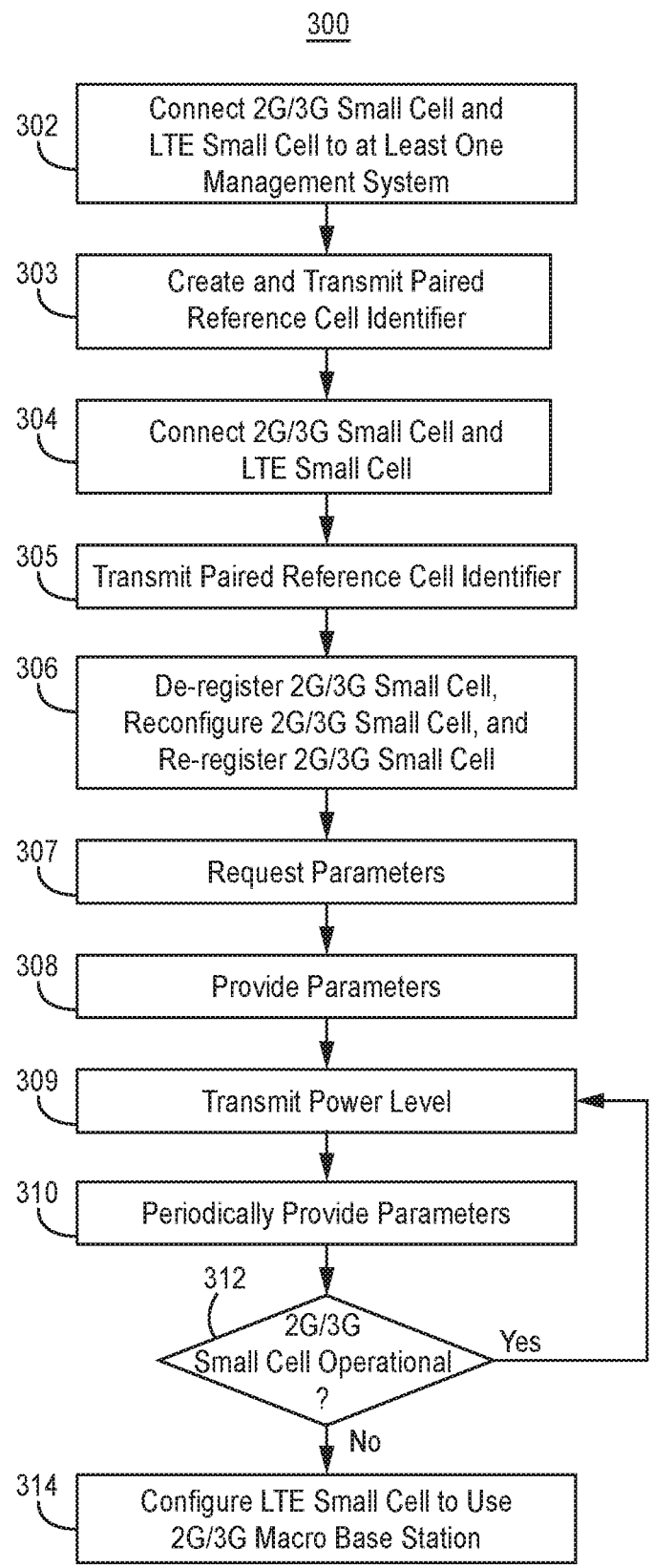
FIG. 3 illustrates one embodiment of a method of providing circuit-switched fall back using a small cell system 103 that is automatically configured, maintained, and modified.

FIG. 3 illustrates one embodiment of a method 300 of providing circuit-switched fall back using a small cell system 103 that is automatically configured, maintained, and modified. The embodiment of method 300 shown in FIG. 3 is described here as being implemented in the system shown FIG. 1, though it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 302, each of the LTE small cell 102 and the 2G/3G small cell 104 are connected to at least one management system, e.g. the device management system 118. In one embodiment, the 2G/3G small cell 104 is also connected to the IP multimedia protocol sub-system 113 if it exists. In another embodiment, in block 303, when the IP multimedia protocol sub-system 113 is used, the at least one management system, such as the device management system 118, creates and sends a paired reference cell identifier to the LTE small cell 102. When an item of user equipment 105 attaches to the LTE small cell 102, the item of user equipment 105 registers for circuit-switched fall back service. The small cell system 103 sends a registration message to the 4G core network 114 with the same paired reference cell identifier so that the item of user equipment 105 can be paged in the event it receives an incoming call or SMS message. Also, the 2G/3G small cell 104, its operating frequency, and for some technologies its physical cell identifier are added to the neighbors list of the LTE small cell 102 which is broadcast to the item of user equipment 105.

Alternatively, in one embodiment, a paired reference cell identifier is not required, e.g. by systems lacking an IP multimedia protocol sub-system 113 such as by UMTS and/or 2G Global System for Mobile Communications (GSM) Enhanced Data rates for GSM Evolution (EDGE) air interfaces. In such circumstances, the mobility management entity 115 maps a tracking area code of corresponding to the LTE small cell 102 and the 2G/3G location area code for 2G/3G small cell 104 when each item of user equipment 105 attaches itself to the LTE small cell 102. This enables the location of the attached item of user equipment to be known by the 4G core network 114 and the 2G/3G core network, e.g. by a mobile switching center and visitor location register of the 2G/3G core network, so that the attached item of user equipment 105 can be paged in the event of an incoming voice call. Also, the 2G/3G small cell 104 and its operating frequency are added to the neighbors list of the LTE small cell 102 which is broadcast to the item of user equipment 105. Thus, the attached item of user equipment 105 is configured to place voice calls through the 2G/3G small cell 104.

In one embodiment, to facilitate attachment of each item of user equipment 105 to the 2G/3G small cell 104 in the absence of packet switch handover, each item of user equipment 105 is directed to the absolute radio frequency channel number of the 2G/3G small cell. In another embodiment, to facilitate attachment of each item of user equipment 105 to the 2G/3G small cell 104 with packet switch handover, the 2G/3G small cell 104 is identified as the target cell in the 51 application protocol handover message of the LTE small cell 102.

In one embodiment, registration occurs when the LTE small cell 102 and the 2G/3G small cell 104 are turned on such as by receiving power or have a power switch placed in the "ON" position. In another embodiment, such registration is communicated through the communications link 110.

In block 304, a connection is formed between the LTE small cell 102 and the 2G/3G small cell 104. In one embodiment, the LTE small cell 102 unicasts, broadcasts, or multicasts its identity and IP address. When received by the 2G/3G small cell 104, the 2G/3G small cell 104 forms a connection with the LTE small cell 102.

In one embodiment, in block 305, if the paired reference cell identifier is used, the LTE small cell 102 transmits the paired reference cell identifier to the 2G/3G small cell 104. In another embodiment, e.g. when a paired reference cell identifier is used, block 306, the 2G/3G small cell 104 de-registers itself from the IP multimedia protocol sub-system 113. Then, the 2G/3G small cell 104 reconfigures itself to use the paired reference cell identifier, and re-registers itself, using the paired reference cell identifier, with the IP multimedia protocol sub-system 113. Finally, when re-registration is complete, the 2G/3G small cell 104 communicates that it has completed re-registration to the LTE small cell 102. In one embodiment, the transmit and receive capabilities of the 2G/3G small cell 104 are disabled prior to de-registration, and enabled subsequent to re-registration.

In one embodiment, in block 307, the LTE small cell 102 requests the 2G/3G small cell 104 to provide 2G/3G small cell system parameters to the LTE small cell 102. In another embodiment, such system parameters include air interface parameters such as operating frequency, channel, and PN offset, and transmit power. Channel shall also mean operating frequency. In a further embodiment, if a paired reference cell identifier is not used, such parameters include a 2G/3G small cell identifier.

In block 308, the 2G/3G small cell 104 provides such system parameters to the LTE small cell 102. In one embodiment, the LTE small cell 102 updates its neighbors list, and e.g. a system information block (SIB) 8 for a CDMA air interface, to identify the 2G/3G small cell 104 as the only neighbor to the LTE small cell 102. The LTE small cell 102 broadcasts such air interface parameters, e.g. using SIB 8 for a CDMA air interface, to the item of user equipment 105 so that the item of user equipment 105 updates such information to enable voice calls through the 2G/3G small cell 104 rather than a 2G/3G base station 108.

In block 309, transmit power of one or both of the LTE small cell 102 and/or the 2G/3G small cell 104 are adjusted to ensure that the 2G/3G small cell 104 coverage area is no larger than the LTE small cell 102 coverage area. In one embodiment, only the LTE small cell 102 adjusts its transmit power to ensure that it has a coverage area that is equal to or slightly smaller than the coverage area of the 2G/3G small cell 104. In another embodiment, the 2G/3G transmit power is initially set based upon the type of environment in which is placed, e.g. an office building versus or an apartment building. In a further embodiment, at least one look up table is included in the data 208 stored in the memory 204 of the processing system 200. The at least one look up table maps the corresponding power levels of the LTE small cell 102 and the 2G/3G small cell 104 necessary to provide the coverage area of the LTE small cell 102 that is equal to or slightly smaller than the coverage area of the 2G/3G small cell 104.

In block 310, periodically 2G/3G small cell system parameters, e.g. the operational status of the 2G/3G small cell 104, are provided from the 2G/3G small cell 104 to the LTE small cell 102. This may be referred to as the 'heart beat' of the 2G/3G small cell 104, which enables the LTE small cell 102 to confirm that the 2G/3G small cell 104 remains operational. Further, in one embodiment, such 2G/3G small cell system parameters include the transmit power of the 2G/3G small cell 104. If the transmit power of the 2G/3G small cell 104 changes, e.g. is reconfigured by at least one management system (such as the device management system 118), such information is conveyed periodically to the LTE small cell 102 so that the transmit powers of one or both of the LTE small cell 102 and the 2G/3G small cell 104 can be adjusted so that the coverage area of the LTE small cell 102 is equal to or slightly smaller than the coverage area of the 2G/3G small cell 104.

In block 312, the LTE small cell determines whether the 2G/3G small cell 104 remains operational. The LTE small cell 102 ascertains if it has received a periodic 'heart beat' from the 2G/3G small cell 104, and if so that the 2G/3G small cell 104 is properly operating. If it has and the 2G/3G small cell 103 is properly functioning, then in one embodiment, the processing associated with block 310, and possibly also block 309, is repeated. In one embodiment, upon returning to block 309, transmit power(s) can be adjusted if necessary as described above, e.g. if the transmit power of the 2G/3G small cell 104 has been modified. If the 'heart beat' from the 2G/3G small cell 104 has not been received or otherwise indicates that the 2G/3G small cell 104 is not properly functioning, e.g. the transmitter is not operable, then, in block 314, the LTE small cell 102 configures itself to use a 2G/3G base station 108 rather than the 2G/3G small cell 104 to provide circuit-switched fall back (CSFB) to the item of user equipment 105. Doing this entails de-registering the paired reference cell identifier of both the LTE small cell 102 and the 2G/3G small cell 104 with the core network 106. In one embodiment, the transceivers of the LTE small cell 102 and the 2G/3G small cell 104 are disabled prior to de-registration, and re-enabled upon re-registration. Then, the LTE small cell 102 and the 2G/3G small cell 104 re-register with their corresponding cell identifiers with the core network 106. In one embodiment, the LTE small cell 102 is then provided, e.g. by the at least one management system such as the device management system 118, the system parameters of the 2G/3G base station 108 in operating range. Such system parameters can include air interface parameters such as operating frequency, channel, and PN offset. In one embodiment, the LTE small cell 102 updates its neighbors list, and e.g. a system information block (SIB) 8 for a CDMA air interface, to identify the 2G/3G base station 108 as the only neighbor to the LTE small cell 102. The LTE small cell 102 broadcasts such air interface parameters, e.g. using SIB8 for a CDMA air interface, to the item of user equipment 105 so that the item of user equipment 105 updates such information so that it will initiate voice calls through the 2G/3G base station 108 rather than the 2G/3G small cell 104.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims. For example, a signal may be a voltage signal or a current signal.

The invention claimed is:
1. A small cell system, comprising:
a Long Term Evolution (LTE) small cell;
wherein the LTE small cell is configured to provide data communications to at least one item of user equipment through the small cell system;
a second generation or third generation cellular technology (2G/3G) small cell coupled to the LTE small cell;
wherein the 2G/3G small cell, when operational, is configured to provide circuit-switched enabled voice calls for the at least one item of user equipment through the small cell system, and to send a signal to the LTE small cell indicating that the 2G/3G small cell is operational;
wherein the LTE small cell is configured to automatically obtain 2G/3G small cell system parameters from the 2G/3G small cell system;
wherein, during operation of the 2G/3G small cell, the LTE small cell is configured to broadcast to the at least one item of user equipment at least one of a cell identifier of the 2G/3G small cell and an operating frequency of the 2G/3G small cell, and where the coverage area of the 2G/3G small cell is no larger than the coverage area for the LTE small cell; and wherein the LTE small cell does not receive the signal, from the 2G/3G small cell, which indicates that the 2G/3G small cell is not operational, then the LTE small cell is configured to broadcast to the at least one item of user equipment at least one of a cell identifier for a 2G/3G base station and an operating frequency for the 2G/3G base station.

2. The small cell system of claim 1, wherein the signal consists of periodically transmitted 2G/3G small cell system parameters.

3. The small cell system of claim 1, wherein the at least one of the cell identifier of the 2G/3G small cell and the operating frequency of the 2G/3G small cell comprises the cell identifier, the operating frequency, band class and pseudo-noise (PN) offset.

4. The small cell system of claim 1, further comprising an Ethernet connection which couples the LTE small cell to the 2G/3G small cell.

5. The small cell system of claim 1, wherein the LTE small cell and the 2G/3G small cell each communicate with the other using one of unicasting, broadcasting, and multicasting.

6. The small cell system of claim 1, further comprising a processing system coupled to the LTE small cell and the 2G/3G small cell;
wherein the processing system comprises a processor coupled to a memory;
wherein the memory comprises software and data; and
wherein the data comprises parameters of the LTE small cell and the 2G/3G small cell.

7. The small cell system of claim 1, wherein each of the LTE small cell and the 2G/3G small cell comprise 2 or more sectors;
wherein the LTE small cell is configured to provide the data communications to the at least one item of user equipment through the small cell system comprises wherein each sector of the LTE small cell is configured to the provide the data communications to the at least one item of user equipment through the small cell system;
wherein the 2G/3G small cell, when operational, is configured to provide the circuit-switched enabled voice calls for the at least one item of user equipment through the small cell system comprises wherein each sector of the 2G/3G small cell, when operational, is configured to provide the circuit-switched enabled voice calls for the at least one user equipment through the small cell system;
wherein the LTE small cell is configured to automatically obtain the 2G/3G small cell system parameters from the 2G/3G small cell comprises wherein each sector of the LTE small cell is configured to automatically obtain 2G/3G small cell system parameters from a corresponding sector of the 2G/3G small cell; and
wherein, during operation of the 2G/3G small cell, the LTE small cell is configured to broadcast to the at least one item of user equipment at least one of the cell identifier of the 2G/3G small cell and the operating frequency of the 2G/3G small cell, and where the coverage area of the 2G/3G small cell is no larger than the coverage area for the LTE small cell comprises wherein, during operation of the each sector of the 2G/3G small cell, each corresponding sector of the LTE small cell is configured to broadcast to the at least one user equipment at least one of a cell identifier of each corresponding sector of the 2G/3G small cell and an operating frequency of each corresponding sector of the 2G/3G small cell, and where a coverage area of each corresponding sector of the 2G/3G small cell is no larger than a coverage area for a corresponding sector of the LTE small cell.

8. A method of operating a small cell system, comprising:
connecting a second or third generation cellular technology (2G/3G) small cell and a Long Term Evolution (LTE) small cell with at least one management system prior to connecting the 2G/3G small cell with the LTE small cell;
wherein the 2G/3G small cell, when operational, is configured to provide circuit-switched enabled voice calls for the at least one item of user equipment through the small cell system;
connecting the 2G/3G small cell with the LTE small cell;
periodically sending 2G/3G small cell parameters, indicating that the 2G/3G small cell is operational, from the 2G/3G small cell to the LTE small cell;
adjusting a 2G/3G small cell coverage area to be no larger than an LTE small cell coverage area;
determining if the LTE small cell received the 2G/3G small parameters; and
determining that the LTE small cell has not received the 2G/3G small cell parameters, then configuring the LTE small cell to use a 2G/3G base station, rather than the 2G/3G small cell, to provide circuit-switched fall back.

9. The method of claim 8, further comprising:
de-registering the 2G/3G small cell after connecting to the 2G/3G small cell with the LTE small cell; and
after de-registering, registering the 2G/3G small cell with a paired reference cell identifier used also by the LTE small cell.

10. The method of claim 8, further comprising the LTE small cell requesting the 2G/3G small cell to provide parameters.

11. The method of claim 8, further comprising creating and transmitting a paired reference cell identifier to the LTE small cell; and
transmitting the paired reference cell identifier from the LTE small cell to the 2G/3G small cell.

12. The method of claim 11, further comprising registering the 2G/3G small cell with an internet protocol (IP) multimedia protocol sub-system (IMS) using the paired reference cell identifier.

13. The method of claim 8, further comprising determining whether the 2G/3G small cell remains operational; and
if the 2G/3G small cell remains operational, adjusting the transmission power of at least one of the 2G/3G small cell and the LTE small cell.

14. A cellular network, comprising:
a small cell system comprising a Long Term Evolution (LTE) small cell coupled to a second or third generation cellular technology (2G/3G) small cell;
wherein the LTE small cell is configured to provide data communications to at least one item of user equipment through the small cell system;
wherein the LTE small cell is configured to automatically obtain 2G/3G small cell system parameters from the 2G/3G small cell;
wherein, during operation of the 2G/3G small cell, the LTE small cell is configured to broadcast to the at least one item of user equipment at least one of a cell identifier of the 2G/3G small cell and an operating frequency of the 2G/3G small cell, and where the coverage area of the 2G/3G small cell is no larger than the coverage area for the LTE small cell;
wherein the 2G/3G small cell, when operational, is configured to provide circuit-switched enabled voice calls for the at least one item of user equipment through the small cell system, and to send a signal to the LTE small cell indicating that the 2G/3G small cell is operational;
wherein LTE small cell does not receive the signal, from the 2G/3G small cell, which indicates that the 2G/3G small cell is not operational, then the LTE small cell is configured to broadcast to the at least one item of user equipment at least one of a cell identifier for a 2G/3G base station and an operating frequency for the 2G/3G base station, and where the LTE small cell is configured to use the 2G/3G base station to provide the circuit-switched enabled voice calls for the at least one item of user equipment; and
a core network coupled to the small cell system and the 2G/3G base station.

15. The cellular network of claim 14, wherein the core network comprises:
a 2G/3G core network;
a 4G core network coupled to the 2G/3G core network;
a device management system; and
wherein the device management system is configured to track and manage at least one of the LTE small cell and the 2G/3G small cell.

16. The cellular network of claim 15, wherein the 2G/3G core network comprises an internet protocol (IP) multimedia protocol sub-system.

17. The cellular network of claim 14, wherein the at least one of the cell identifier of the 2G/3G small cell and the operating frequency of the 2G/3G small cell comprises the cell identifier, the operating frequency, band class and pseudo-noise (PN) offset.

18. The cellular network of claim 14, wherein the LTE small cell and the 2G/3G small cell each communicate with the other using one of unicasting, broadcasting, and multicasting.

19. The cellular network of claim 14, further comprising a processing system coupled to the LTE small cell and the 2G/3G small cell;
wherein the processing system comprises a processor coupled to a memory;
wherein the memory comprises software and data; and
wherein the data comprises parameters of the LTE small cell 102 and the 2G/3G small cell.

20. The cellular network of claim 14, wherein each of the LTE small cell and the 2G/3G small cell comprise 2 or more sectors;
wherein the LTE small cell is configured to provide the data communications to the at least one item of the user equipment through the small cell system comprises wherein each sector of the LTE small cell is configured to provide data communications to the at least one item of the user equipment through the small cell system;
wherein the LTE small cell is configured to automatically obtain the 2G/3G small cell system parameters from the 2G/3G small cell comprises wherein each sector of the LTE small cell is configured to automatically obtain the 2G/3G small cell system parameters from a corresponding sector of the 2G/3G small cell;
wherein, during operation of the 2G/3G small cell, the LTE small cell is configured to broadcast to the at least one item of user equipment the at least one of the cell identifier of the 2G/3G small cell and the operating frequency of the 2G/3G small cell, and where the coverage area of the 2G/3G small cell is no larger than the coverage area for the LTE small cell comprises wherein, during operation of each sector of the 2G/3G small cell, each corresponding sector of the LTE small cell is configured to broadcast to the at least one item of the user equipment at least one of a cell identifier of each corresponding sector of the 2G/3G small cell and an operating frequency of the each corresponding sector of the 2G/3G small cell, and where the coverage area of the each corresponding sector of the 2G/3G small cell is no larger than a coverage area for a corresponding sector of the LTE small cell; and wherein the 2G/3G small cell, when operational, is configured to provide the circuit-switched enabled voice calls for the at least one item of user equipment through the small cell system comprises wherein each sector of the 2G/3G small cell, when operational, is configured to provide circuit-switched enabled voice calls for the at least one item of user equipment through the small cell system.

* * * * *